United States Patent [19]
Imao

[11] Patent Number: 6,032,776
[45] Date of Patent: Mar. 7, 2000

[54] AUTOMATIC OPERATING APPARATUS FOR A FRICTION CLUTCH

[75] Inventor: Toshio Imao, Nagoya, Japan

[73] Assignee: Aichi Kikai Kogyo Kabushiki Kaisha, Nagoya, Japan

[21] Appl. No.: 09/139,737

[22] Filed: Aug. 25, 1998

[30] Foreign Application Priority Data

Sep. 12, 1997 [JP] Japan .................................. 9-267746

[51] Int. Cl.$^7$ ............................ F16D 29/00; B60K 41/16
[52] U.S. Cl. ....................... 192/84.6; 192/90; 192/91 R; 192/114 R; 74/89.15
[58] Field of Search ................. 192/84.6, 90, 91 R, 192/91 A, 114 R, 20; 74/89.15

[56] References Cited

U.S. PATENT DOCUMENTS

| | | | |
|---|---|---|---|
| 3,640,138 | 2/1972 | Hahn et al. | 192/89.15 |
| 4,454,936 | 6/1984 | Wise | 192/219.7 |
| 4,596,316 | 6/1986 | Crossman | 192/84.6 |
| 4,635,491 | 1/1987 | Yamano et al. | 74/89.15 |
| 5,033,566 | 7/1991 | Moretti et al. | 74/89.15 X |
| 5,203,222 | 4/1993 | Hirai | 74/89.15 |
| 5,839,561 | 11/1998 | Koda et al. | 192/90 |

FOREIGN PATENT DOCUMENTS

| | | | |
|---|---|---|---|
| 2-62429 | 3/1990 | Japan | 192/90 |
| 875514 | 8/1961 | United Kingdom | 192/91 R |

*Primary Examiner*—Charles A. Marmor
*Assistant Examiner*—Ha Ho
*Attorney, Agent, or Firm*—Dennison, Meiserole, Scheiner & Schultz

[57] ABSTRACT

An automatic clutch operating control apparatus which can rapidly perform the disconnection of a friction clutch of a transmission by the assistance of the accumulated load in a coil spring. Comprising a motor 4 rotatable forward and backward; reduction means 27, 23 for reducing the rotation of the motor 4; movement conversion means 19, 21, 15, 9 for converting the rotation of the motor to the axial movement of a piston rod 6; a hydraulic master cylinder 3 including the piston rod 6 for supplying working oil into a friction clutch to compress the spring in the clutch so that the clutch will be disconnected; a coil spring 31 provided on the piston rod 6 of the hydraulic master cylinder 3 so as to accumulate the load by the compression due to the repulsive force of the spring in the clutch when the motor 4 is rotated backward to connect the clutch and so as to release the accumulated load when the motor 4 is rotated forward.

1 Claim, 1 Drawing Sheet

AUTOMATIC OPERATING APPARATUS FOR A FRICTION CLUTCH

BACKGROUND OF THE INVENTION

1. Field of the Invention

The present invention relates to an automatic clutch operating apparatus for performing the connection and disconnection of the friction clutch for an automotive transmission by an electronically-controlled motor-driven operation device through a hydraulic master cylinder and a hydraulic operating cylinder.

2. Prior Art

In a transmission of an automobile, utilization of a so-called automatic hydraulic pressure generator is known where a friction clutch is connected or disconnected by a hydraulic master cylinder operated by a computer-controlled motor. In such an automatic hydraulic pressure generator, an operation device for operating a hydraulic master cylinder by a motor is disclosed in DE-A No.4433824. In the constitution of the operation device, a worm is provided on an output shaft of a motor, and a piston rod of the hydraulic master cylinder is connected by a pin to a worm wheel meshing with the worm. According to such a constitution, rotation of the motor is reduced by the worm and the worm wheel and thereby torque is increased. Further, by utilizing the lever ratio due to the difference of the distance between the rotation center of the worm wheel and the connection point of the piston rod and the distance between the rotation center of the worm wheel and the meshing point of the worm and the worm wheel, the torque is increased and the rotary motion of the worm wheel is converted into the linear motion of the piston rod.

However, since the operation device in DE-A No.4433824 intends to increase the torque utilizing the meshing of the worm and the worm wheel, it is disadvantageous that the motion of the piston rod is slow, the hydraulic cylinder can not operate rapidly and the responsibility of control to connect and disconnect the friction clutch is deteriorated.

Further, since the worm and the worm wheel mesh with each other substantially in point contact and the pressure is concentrically applied in the worm axis direction to the meshing point of the worm and the worm wheel, it is disadvantageous that the durability of the worm is liable to deteriorate.

SUMMARY OF THE INVENTION

An object of the invention is to provide an automatic control apparatus for a friction clutch in which the forward rotation of a motor is reduced through a reduction means and converted through a movement conversion means into an axial movement, the piston rod of a hydraulic master cylinder is moved in the axial direction, the working oil from a hydraulic master cylinder is supplied through the hydraulic operating cylinder into a friction clutch to compress the spring in the clutch, so that the clutch is disconnected.

Another object of the invention is to provide an automatic operating apparatus for a friction clutch in which the piston rod of a hydraulic master cylinder is provided with a load accumulating means which can accumulate the load by the compression due to the repulsive force of the spring in the clutch when the motor is rotated backward to thereby connect the clutch and which can release the accumulated load when the motor is rotated forward to disconnect the clutch.

A further object of the invention is to provide an automatic operating apparatus for a friction clutch in which accumulated-load holding means for engaging with said piston rod to stop the movement of it is provided so as to maintain the accumulated condition of the load by said load accumulating means.

A still further object of the invention is to provide an automatic operating apparatus for a friction clutch in which when the clutch of a transmission is disconnected, the piston rod of a hydraulic master cylinder can be strongly pressed and moved by the driving force of the motor and the accumulated load in a load accumulating means, so that the disconnection of the friction clutch can be extremely fast and strongly performed.

Still another object of the invention is to provide an automatic clutch operating apparatus in which the friction clutch is composed of a dry monoplate clutch with a diaphragm spring, the load accumulating means is composed of a compression coil spring provided around the outer circumference of the piston rod of a hydraulic master cylinder, and the accumulated-load holding means is composed of a combination of a cam mechanism and a ratchet mechanism.

A further object of the invention is to provide an automatic clutch operating apparatus in which the coil spring can accumulate the load by the compression due to the repulsive force of the diaphragm spring in the friction clutch, so that the disconnection of the clutch can be fast and strongly performed according to the accumulated urging force of the coil spring.

A still further object of the invention is to provide an automatic clutch operating apparatus which is formed in a compact constitution provided with a movement-conversion means and a piston rod of a hydraulic master cylinder disposed in parallel to each other.

DESCRIPTION OF THE PREFERRED EMBODIMENT

Figure 1:
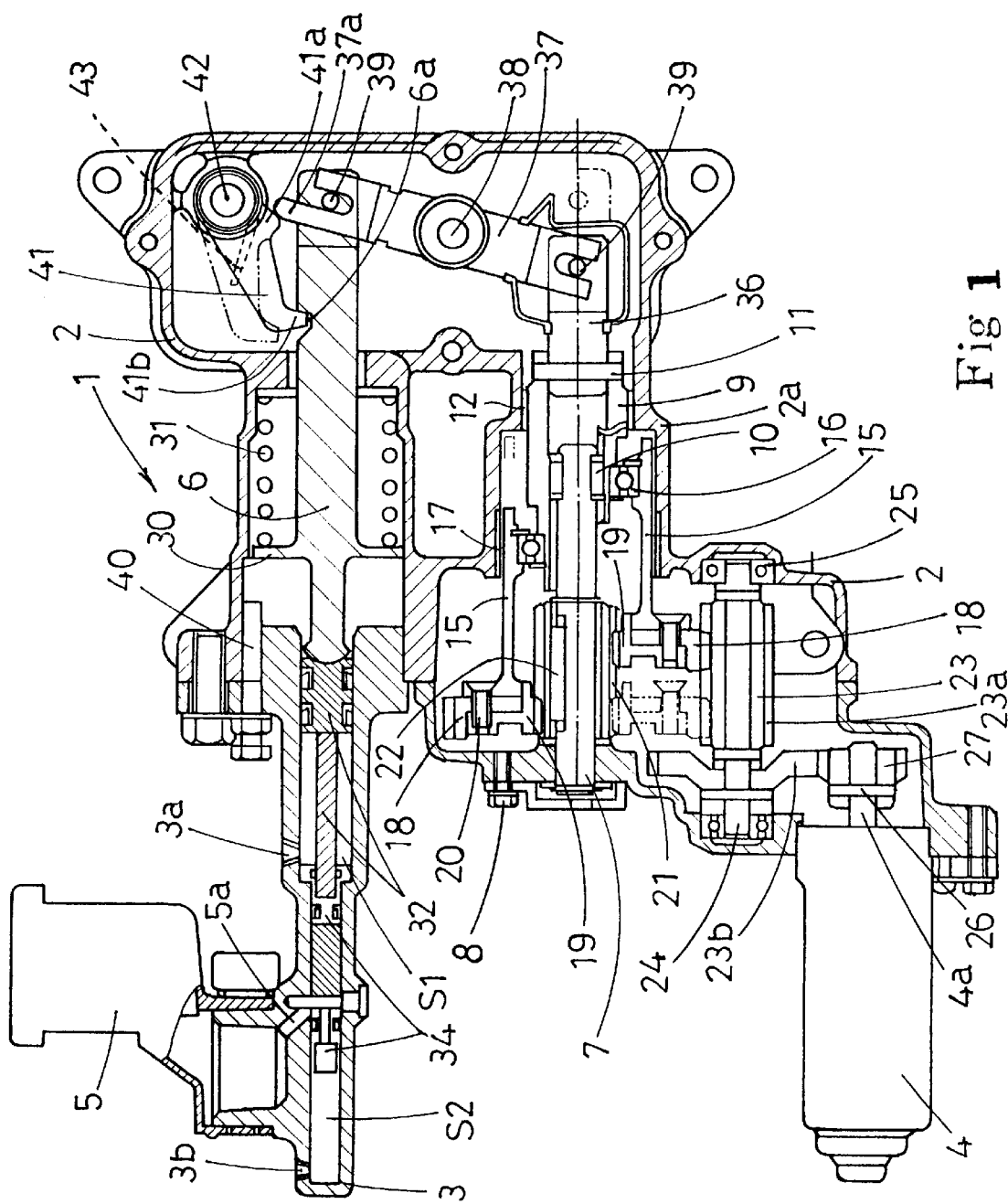
FIG. 1 is a sectional view of an automatic operating apparatus for a friction clutch.

An embodiment of the present invention will be described in detail with reference to FIG. 1 hereinafter. The automatic operating apparatus for a friction clutch in the embodiment is constituted as shown in a sectional view of FIG. 1. In FIG. 1, the automatic operating apparatus for performing the connection and disconnection of the friction clutch (not shown) of an automotive transmission by computer control includes a motor 4, a hydraulic master cylinder 3, and a reservoir 5 disposed on the upper side of the hydraulic master cylinder 3.

The motor 4 is rotatable forward and backward and is driven and controlled by a computer (not shown). The hydraulic master cylinder 3 has connection ports 3a, 3b communicating with the pipings for an operating cylinder of a friction clutch (not shown). When a piston rod 6 of the hydraulic master cylinder 3 is moved forward by drive of the motor 4, the hydraulic master cylinder 3 generates hydraulic pressure and supplies it to the operating cylinder, and when the piston rod 6 is moved rearward, the hydraulic pressure is released.

In a housing 2 are separated and disposed in parallel a stationary shaft 7 in the motor 4 side and the piston rod 6 in the hydraulic master-cylinder 3 side. On the right end in the figure of the stationary shaft 7 is coaxially provided a moving shaft 36 connected to a sleeve 9. To the end of this moving shaft 36 is connected one end of a counter lever 37 through a pin 39, which lever 37 can pivot on a fulcrum shaft 38 positioned at the center thereof. The upper end in the figure of the lever 37 is coupled to one end of the piston rod 6 through a pin 39. Around the circumference of the piston rod 6 is disposed the coil spring 31. To the left end in the figure of the piston rod 6 is connected a main chamber piston 32 in the hydraulic master cylinder 3, further in the left side of which is disposed the supplementary chamber piston 34.

On the stationary shaft 7, the sleeve 9 is mounted slidably in the axial direction, but not rotatably, through a slide key 10, and the rear end of the sleeve 9 is fixed to the moving shaft 36 through a coupling pin 11. Also, on the inner circumference of a cylindrical portion 2*a* of the housing 2 is mounted a bearing 12 slidably engaging with the outer circumference of the sleeve 9. In the cylindrical portion 2*a*, a slider 15 is coupled with the front end part of the sleeve 9 so as to be rotatable relatively to and movable integrally with the sleeve 9 in the axial direction through a slider bearing 16. That is, the sleeve 9 is fixed to an inner race of the slider bearing 16 and the slider 15 is fixed to an outer race of the slider bearing 16. Also, the outer circumference of the slider 15 is guided by a bearing 17 mounted on the inner circumference of the cylindrical portion 2*a*. At the front side of the slider 15, a slider side actuator gear 18 having outer circumferential teeth and a female screw member 19 with a female thread formed on the inner circumference are fixed in overlaid state in the axial direction by screws 20–20 (only one screw is shown in the figure). Also, at the front part of the stationary shaft 7 positioned in the inside of the female screw member 19, a male screw member 21 meshing with the female screw member 19 is fixed not to be rotatable through a fixing key 22.

On the lower side of the slider side actuator 18, a counter-shaft side actuator gear 23 is positioned. The counter-shaft side actuator 23 is mounted on a counter shaft 24 which is in parallel to the stationary shaft 7, and the counter shaft 24 is supported at both ends on the housing 2 through ball bearings 25, 25. The counter-shaft side actuator 23 comprises a first gear part 23*a* meshing with the slider side actuator gear 18 and a second gear part 23*b* of larger diameter with teeth more in number than the first gear part 23*a*. The first gear part 23*a* is formed longer in length (in the axial direction) than that of the slider side actuator gear 18 and thereby the slider 15 can be moved in the axial direction. Also, the second gear part 23*b* meshes with a motor side actuator gear 27 mounted on the motor shaft 4*a* of the motor 4 through a spring pin 26 and having teeth less in number than the second gear part 23*b*. The motor side actuator gear 27, the counter-shaft side actuator gear 23 and the slider side actuator gear 18 constitute an actuator gear train When the motor 4 is started, rotation of the motor 4 is reduced by the actuator gear train and the reduced rotation is transmitted to the slider 15. Then, by meshing of the female screw member 19 fixed to the slider 15 and the male screw member 21 of the stationary shaft 7, the slider 15 is, attendant on the rotation, moved backward with respect to the stationary shaft 7 (to the right in the figure). And together with the slider 15, the sleeve 9 and the moving shaft 36 are moved and further the piston rod 6 are moved forward through the counter lever 37, so that the hydraulic pressure is generated in the hydraulic master cylinder 3.

Next, in order that the hydraulic pressure generating state is transferred to the hydraulic pressure release state, the motor 4 is rotated in the backward direction. Then, the slider 15 is moved backward with respect to the stationary shaft 7, and together with the slider 15, the sleeve 9 and the moving shaft 36 are moved backward, and further the piston rod 6 is moved through the counter lever 37, so that the hydraulic pressure release state is produced.

Next, the features of the present invention will be described in detail. On the outer circumference of the piston rod 6 of the hydraulic master cylinder 3 is secured an engaging plate 30, and around the outer circumference of the piston rod 6 is disposed a coil spring 31 which is in the state where the one end of the spring 31 is supported on the engaging plate 30. This coil spring 31 is compressed to accumulate the load when the piston rod 6 is moved to the right in the figure.

In the hydraulic master cylinder 3 are formed a main pressure generating chamber S1 and a supplementary pressure generating chamber S2. In the main pressure generating chamber S1 is disposed a main chamber piston 32, which is disposed coaxially with the piston rod 6 and adapted to move subsequently to the movement of the piston rod 6.

The supplementary pressure generating chamber S2 is formed between a supplementary chamber piston 34 and the outside wall of the hydraulic master cylinder 3. The supplementary chamber piston 34 is disposed coaxially with and in the left side (in the FIGURE) of the main chamber piston 32. In the hydraulic master cylinder 3 is formed a main chamber port 3*a* communicating with the main pressure generating chamber S1. With this main chamber port 3*a* is connected a hydraulic piping communicating with the hydraulic operating cylinder. Also, there is formed a supplementary chamber port 3*b* communicating with the supplementary pressure generating chamber S2. With this supplementary chamber port 3*b* is connected a supplementary chamber control valve composed of a solenoid valve through a hydraulic piping, which control valve is connected with the above-described hydraulic operating cylinder. Incidentally, the hydraulic operating cylinder is adapted to supply working oil through a clutch release mechanism into a friction clutch in an automotive transmission (not shown).

Further, in the hydraulic master cylinder 3 is provided an open passage 5*a*, with which is connected an atmospheric control means for controlling the communication between the supplementary pressure generating chamber S2 and the reservoir 5.

In this embodiment, the friction clutch of the transmission is composed of a dry monoplate clutch with a diaphragm spring.

Incidentally, the motor side actuator gear 27 and counter-shaft side actuator gear 23 constitute a reduction means for reducing the rotation of the motor 4. The male screw member 21, female screw member 19, slider side actuator gear 18, slider 15, sleeve 9, etc. constitute a movement conversion means for converting the rotation into the axial movement. The coil spring 31 makes up a load accumulating means which can accumulate the load.

Further, in the housing 2 is provided a stopper 40 in parallel with the piston rod 6 for controlling the movement of the piston rod 6. This stopper 40 is properly adjustable.

Further more, on the upper surface of the piston rod 6 is formed a notch 6*a* like a depression, which is adapted to engage with a hook 41*b* which is rotatable on a pivot 42 in a ratchet mechanism 41. The ratchet mechanism 41 is provided with a return spring 43 winding around it, and thereby the hook 41*b* is always energized against the notch 6*a*. Besides, on the pivot 42 is fixedly provided a cam 41*a*, which is brought into contact with a cam actuating portion 37a projected upward on the top end of the above-described counter lever 37. When the cam actuating portion 37a is moved to the left in the FIGURE, the ratchet mechanism 41 is separated from the notch 6a on the piston rod 6 through the cam 41a. The ratchet mechanism 41, cam 41a, and cam actuating portion 37a constitute an accumulated-load holding means.

In such a constitution, when the disconnection of the friction clutch of the transmission (not shown) is started, the supplementary chamber control valve is made in the open condition. The motor 4 is rotated in the forward direction and the first axial load acts on the piston rod 6 through the reduction means, the movement conversion means and counter lever 37. At this time, the cam actuating portion 37a of the counter lever 37 makes the ratchet mechanism 41 separate from the notch 6a of the piston rod 6 through the cam 41a, so that the piston rod 6 is released from the engagement of the hook 41b and the coil spring 31 accumulating the load by compression extends to the left side in the figure as discharging the load. Further, the second axial load due to the coil spring 31 acts on the piston rod 6, pressing it to the left side in the figure to assist the driving power of the motor 4. Thereby, the main chamber piston 32 and the supplementary chamber piston 34 are pressed and moved to the left side in the FIGURE, and the main pressure generating chamber S1 and the supplementary pressure generating chamber S2 are compressed. Then, the working oil is supplied into the hydraulic operating cylinder (not shown) from the respective communicating ports 3a, 3b. Thereby, the diaphragm spring in the friction clutch of a transmission is pressed to disconnect the friction clutch. As a result, the disconnection of the friction clutch is started fast and strongly by the driving force of the motor 4 and the urging force of the coil spring 31.

Thus, when the disconnection of the friction clutch is completed, the piston rod 6 has come into contact with the stopper 40, the supplementary chamber control valve is closed, and the working oil is tightly held in the hydraulic operating cylinder (not shown) and the main pressure generating chamber S1. As a result, the friction clutch is maintained in the completely disconnected condition.

Next, when the connection of the friction clutch is started, with the supplementary chamber control valve in the closed condition, the motor 4 is operated in the backward rotation, and the movement of the piston rod 6 to the right side in the figure is started. At this time, the working oil in the hydraulic operating cylinder is returned through the clutch release mechanism into the main pressure generating chamber S1 of the hydraulic master cylinder 3 owing to the repulsive force of the diaphragm spring in the friction clutch (not shown), and the main chamber piston 32 is moved to the right side in the figure. Thereby, the piston rod 6 is moved to the right side in the FIGURE, gradually compressing the coil spring 31 to accumulate the load therein. When the piston rod 6 has reached the predetermined position, the notch 6a is engaged with the hook 41b of the ratchet mechanism 41, so that the piston rod 6 has come into the engaged condition with the housing 2. Thus, the coil spring 31 is maintained in the compressed condition, so that the load is effectively stored and held in the coil spring 31, and even after the connection of the friction clutch is completed, the load is stored and held in the coil spring 31.

When the motor 4 is stopped, the supplementary chamber control valve is opened, the entire working oil remaining in the hydraulic operating cylinder is returned into the supplementary pressure generating chamber S2. Thereby, the supplementary chamber piston 34 which is left behind is moved until it is brought into contact with the end of the main chamber piston 32. As a result, since the atmospheric control valve for controlling the communication with the reservoir 5 is opening, the working oil including that of the main pressure generating chamber S1 is released into the atmospheric pressure, so that the operating force for the friction clutch is rendered into the completely released condition.

In the embodiment of the present invention as described above, the disconnection of the friction clutch is performed when the spring in the friction clutch (not shown) is compressed by the driving force of the forward rotation of the motor 4. This spring in the friction clutch exerts the repulsive force to the above-described coil spring 31, so that the load can be accumulated in the compressed coil spring 31. After this, when the disconnection of the friction clutch is started by the forward rotation of the motor 4, the accumulated load in the coil spring 31 is released, and the working oil is fast and strongly supplied by the driving force of the motor 4 and the urging force of the coil spring 31 into the hydraulic operating cylinder from the hydraulic master cylinder 3, so that the friction clutch can be rapidly disconnected. Thereby, the driving power transmitted to the transmission from the engine can be fast and strongly cut.

What is claimed is:

1. An automatic operating apparatus for controlling a friction clutch, comprising:

a motor rotatable forward and backward;

reduction means for reducing the rotation of said motor;

movement conversion means for converting the reduced rotation of the motor to the axial movement of a piston rod;

a reservoir with working oil;

a hydraulic master cylinder including said piston rod supplying working oil into a friction clutch through a hydraulic operating cylinder to compress a spring in a friction clutch so that the friction clutch becomes disconnected;

load accumulating means provided on the piston rod of said hydraulic master cylinder so as to accumulate the load by the compression due to the repulsive force of the spring in the friction clutch when the motor is rotated backward to connect the clutch and to release the accumulated load when the motor is rotated forward;

accumulated-load holding means for engaging with the piston rod to stop the movement of the piston rod so as to maintain the accumulated condition of the load by the load accumulating means, and wherein said load accumulating means is composed of a compression coil spring provided around the outer circumference of the piston rod of the hydraulic master cylinder, said accumulated-load holding means is composed of a combination cam mechanism and ratchet mechanism; said movement conversion means and the piston rod of the hydraulic master cylinder are disposed in parallel; and respective ends of the movement conversion means and the piston rod are connected by a counter lever which can pivot on a fulcrum.

* * * * *